United States Patent
Vandenabeele et al.

(10) Patent No.: US 6,744,827 B1
(45) Date of Patent: Jun. 1, 2004

(54) DEMODULATOR ARRANGEMENT, METHOD TO DEMODULATE, AND TELECOMMUNICATION SYSTEM COMPRISING SUCH A DEMODULATOR ARRANGEMENT

(75) Inventors: Peter Michel Noël Vandenabeele, Boutersem (BE); Johan Joseph Gustaaf Haspeslagh, Linden (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/468,347

(22) Filed: Dec. 21, 1999

(30) Foreign Application Priority Data

Dec. 29, 1998 (EP) .............................. 98403327

(51) Int. Cl.⁷ .............................. H04L 27/38
(52) U.S. Cl. .................. 375/320; 375/261; 375/325; 375/330; 329/317; 329/345; 329/371
(58) Field of Search ................. 375/269, 270, 375/320, 324, 325, 330, 331, 340, 261; 329/304, 348, 317, 345, 371

(56) References Cited

U.S. PATENT DOCUMENTS 3,983,485 A * 9/1976 Stuart ........................ 375/269
5,774,502 A   6/1998 Belcher et al.
6,046,629 A * 4/2000 Akiyama et al. ........... 329/304

FOREIGN PATENT DOCUMENTS

EP  0 738 064 A2  10/1996
JP  60 150 359 A   8/1985

OTHER PUBLICATIONS

"Demodulator with FEC Decoder ha on –chip Timing Recovery". Paul McGoldrick, pp. 55–64, Electronic Design Sep. 3, 1996.
Pages 324–327, chapter 11, "Modern Quadrature Amplitude Modulation, Principles and Applications for Fixed and Wireless Communications", William Webb and Lajos Hanzo, by Pentech Press, London.
Benedetto, et al.: "Intersymbol Interference Sensitivity of some Multilevel Digital Transmission Schemes" Alta Frequenza, vol. 43, No. 7, Jul. 1974, pp. 377–389, XP0007591666 Milan, IT.
Salz, et al.: "DATA transmission by combined AM and PM" Bell System Technical Journal, vol. 50, No. 7, Sep. 1971, pp. 2399–2419, XP000760983, New York, US.
Kishi, Kuno: "Application of the Analytic receive in and PSK–DOE to the 16QAM and its characteristics on poor radion channels" 1996 IEEE Vehicular Technology Conference, Apr. 28, 1996–May 1, 1996, pp. 998–10002, XP000593119, New York, US.
Adachi, Sawashi: "Decision feedback differential detection of differentially encoded 16APSK signals" IEEE Transactions on Communications, vol. 44, No. 4, Apr. 1996, pp. 416–418, XP000587073, New York, US.

* cited by examiner

Primary Examiner—Amanda T. Le
(74) Attorney, Agent, or Firm—Sughrue Mion, PLLC

(57) ABSTRACT

A demodulator arrangement, suitable to demodulate data symbols modulated in accordance with a predefined constellation diagram and sent as part of information bursts (A1, B1, C1, D1, A2, B2, C2, D2) over a transmission medium with substantially stable attenuation characteristics, detects the amplitude of the data symbols in a coherent way and detects the phase of the data symbols in a differential way.

19 Claims, 2 Drawing Sheets

DEMODULATOR ARRANGEMENT, METHOD TO DEMODULATE, AND TELECOMMUNICATION SYSTEM COMPRISING SUCH A DEMODULATOR ARRANGEMENT

BACKGROUND OF THE INVENTION

The present invention relates to a demodulator arrangement, a method for demodulation of data symbols performed by such a demodulator arrangement, and a telecommunication system comprising such a demodulator.

Such a demodulator arrangement and method to demodulate are already known in the art, e.g. from the article *'Demodulator With FEC Decoder Has On-Chip Timing Recovery'* from the author Paul McGoldrick. This article was published on pages 55–64 of the magazine *'Electronic Design'* of Sep. 3, 1996. In this article, a family of demodulators is described suitable for reception and demodulation of television signals transferred over a cable, for instance an optical fibre or coax cable. Data symbols are modulated in the known system in accordance with a constellation diagram that is shown in FIG. 2 on page 58, and that is described via the tables on page 56 of the cited article. The drawn constellation diagram contains 64 constellation points and has a rectangular shape. The same constellation diagram evidently is used in the demodulator of the known system to demodulate received data symbols. The known demodulator, shown in FIG. 1 of the above mentioned article, contains a fully coherent detector which determines the amplitude and phase of the data symbols independently of one another. To be able to accurately determine the amplitude of the received data symbols, the demodulator includes an automatic gain control loop which compensates for changes in the amplitude attenuation of the cable whereover the information is transferred. In addition, to be able to accurately determine the phase of received data symbols, the known demodulator includes a timing recovery loop which is described in detail in the paragraph 'Jittering Towards Zero' on the lower half of page 58 of the cited article. The timing recovery loop has the task to establish a phase reference for the incoming information bursts. As will be appreciated by any skilled person and as can be understood from the paragraphs 'System Overview' on pages 55–56 and 'Jittering Towards Zero' on page 58 of the cited article, the automatic gain control loop and the timing recovery loop have a significant share in the hardware complexity of the known television signal demodulator. Moreover, such a coherent detector typically requires a fairly long acquisition time when working in blind acquisition mode. Using a training sequence at the start of everey information burst may reduce the acquisition time of coherent detectors to a few symbols but the current commercially available QAM-receivers are not suited for this application.

SUMMARY OF THE INVENTION

It is an object of the present invention to provide a demodulator arrangement suitable to receive and demodulate data symbols transmitted as part of information bursts over a transmission medium with stable attenuation characteristics, but whose hardware complexity is significantly reduced in comparison with that of the known demodulator arrangement and whose acquisition time is reduced significantly. In addition, it is an object of the present invention to provide a related demodulation method and telecommunication system.

According to the invention, this object is realised by the demodulator arrangement defined in claim 1, the method to demodulate data symbols defined in claim 7, and the telecommunication system defined in claim 8.

Indeed, in case bursty information is transferred over a transmission channel with in time slowly varying attenuation characteristics, coherent amplitude detection will be successful without the need for an automatic gain control loop. If the information is transferred over a channel, for instance a copper twisted pair cable, a coax cable or an optical fibre, whose gain remains stable in time, no automatic gain control is required to enable coherent amplitude detection. It is sufficient that the attenuation of the channel is measured once at initialisation of the system. On the other hand, by using a differential phase detector which detects the phase of a data symbol by measuring the phase difference with the phase of the previously received data symbol, no timing and/or carrier recovery loops are required in the demodulator according to the present invention, although the traffic has a bursty character. Differential phase detection is a known technique used in fully differential demodulator arrangements which are used to detect data symbols sent over transmission channels with fast varying amplitude and phase characteristics such as radio links. Such a fully differential detector for instance is known from pages 324–327 of the book *'Modern Quadrature Amplitude Modulation, Principles and Applications for Fixed and Wireless Communications'*, written by William Webb and Lajos Hanzo, and published by Pentech Press, London. Summarising, according to the present invention differential phase detection is combined with coherent amplitude detection in a detector used to receive bursty information transferred over a gain stable link. Thereby, control loops for amplitude and phase are avoided so that the demodulator's hardware complexity is reduced significantly.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

In a particular embodiment of the present invention, a large constellation scheme is used as defined in claim 2.

An additional feature of the present invention is defined in claim 3.

In this way, by using a circular constellation diagram wherein phases are distributed equidistantly and wherein amplitude levels are equidistant, robustness for noise of the coherent amplitude, differential phase detector according to the present invention is minimised.

A further feature of the demodulator arrangement according to the present invention is defined in claim 4.

In this way, by using a so called staggered constellation diagram instead of a linear constellation diagram, the distance between constellation points is increased which even more improves robustness for noise.

Furthermore, an embodiment of the present invention is adapted for upstream transmission in a time multiplexed way over a hybrid fibre coax network as defined in claim 5.

Indeed, the hybrid optical fibre/coaxial cable transmission medium of a hybrid fibre coax network has a stable gain in time. Moreover, because the medium is shared in a time division multiplexed way, upstream transmission occurs in bursts which makes applicability of the present invention to hybrid fibre coax systems very suitable.

Alternatively, an embodiment of the present invention is adapted for downstream transmission in an hybrid fibre coax system, as defined by claim 6.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
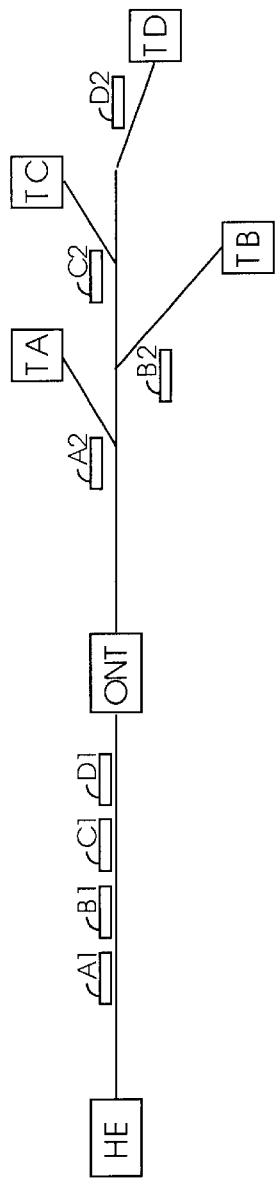
FIG. 1 a drawing illustrating the architecture of a hybrid fibre coax system wherein an embodiment of the present invention is used.

The hybrid fibre coax system drawn in FIG. 1 includes a head end station HE, an optical network termination ONT and four terminals TA, TB, TC and TD. The head end station HE is coupled via a bi-directional optical fibre link to the optical network termination ONT and the latter optical network termination ONT is coupled to the terminals TA, TB, TC and TD via a common coax link and respective individual coax links, which are also suitable for bi-directional transmission. The upstream and downstream directed signals occupy different frequency bands on the optical fibre and coaxial links of the hybrid fibre coax system.

In the upstream direction, i.e. the direction from the terminals TA, TB, TC and TD to the head end station HE, the terminals TA, TB, TC and TD send data packets which share the common coax link towards the optical network termination ONT in a time multiplexed way. The data packets A1 and A2 thus occupy timeslots assigned after a ranging procedure performed at initialisation of the system to the terminal TA. Similarly, the data packets B1 and B2 occupy timeslots assigned to the terminal TB, data packets C1 and C2 occupy timeslots assigned to the terminal TC, and data packets D1 and D2 occupy timeslots assigned to the terminal TD. The optical network termination ONT is responsible for the electro/optical conversion of the upstream transferred data packets A1, B1, C1, D1, A2, B2, C2, D2 and the so generated optical signal is transmitted at a high bitrate towards the head end station HE. In the head end station HE, the optical signal is opto/electrical converted and the so generated data packets are applied to a demodulator arrangement, according to the present invention. For amplitude and phase demodulation of the data symbols that constitute the data packets, the demodulator arrangement in the head end station HE uses the constellation scheme of FIG. 2. The structure of this demodulator arrangement is illustrated by FIG. 3.

In the downstream direction, i.e. the direction from the head end station HE to the terminals TA, TB, TC and TD, the head end station HE broadcasts information after modulation and electro/optical conversion thereof. This information stream is opto/electrical converted in the optical network termination ONT and further broadcasted over the coaxial network towards the terminals TA, TB, TC and TD. The downstream broadcasted information stream, which after receipt is demodulated in the terminals TA, TB, TC and TD, is not illustrated in the figure FIG. 1. To be able to demodulate the downstream broadcasted information stream, the terminals TA, TB, TC and TD are each equipped with a demodulator arrangement according to the present invention. The constellation scheme used by this demodulator arrangement is drawn in FIG. 2, and the structure of this demodulator arrangement is again that of FIG. 3. In other words, the pure theoretical system drawn in FIG. 1 uses the same constellation scheme for upstream and downstream transmission and the same demodulator arrangement for demodulation of the upstream and downstream transmitted information.

For the demodulator arrangements in the head end station HE and the terminals TA, TB, TC and TD, it is assumed that the amplitude of the received signals is known. This amplitude knowledge may be obtained by a ranging technique, performed during initialisation of the system, or via a look-up table. In a similar way, it is assumed that the symbol timing is known for received signals in the head end station HE as well as in the terminal stations TA, TB, TC and TD. This symbol timing knowledge also may be obtained by a ranging technique or alternatively, via a look-up table. Another assumption is that the carrier frequency of the upstream or downstream transmitted signals is not exactly known by the receiver and the carrier phase is not at all known. This carrier phase is affected by noise from tuners on top of white Gaussian noise. Every upstream channel moreover may be supposed to be equipped with an equaliser with slowly varying settings that are tuned via a separate training cycle. Since equalisation is not the subject of the present invention, no more details will be given with respect thereto in the remainder of this application.

Figure 2:
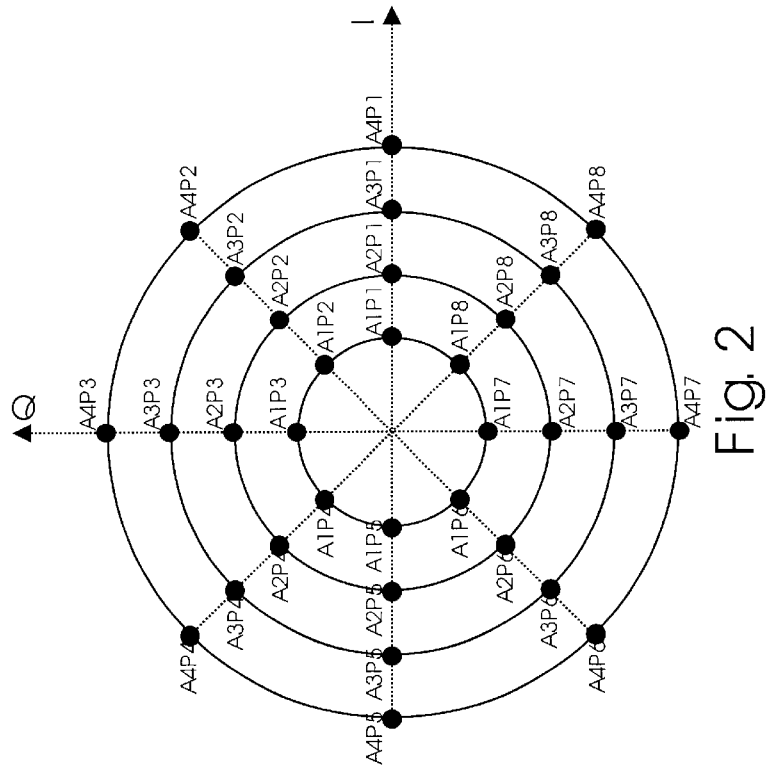
FIG. 2 shows the constellation diagram used in the system of FIG. 1 for modulation and demodulation of data symbols.
Figure 3:
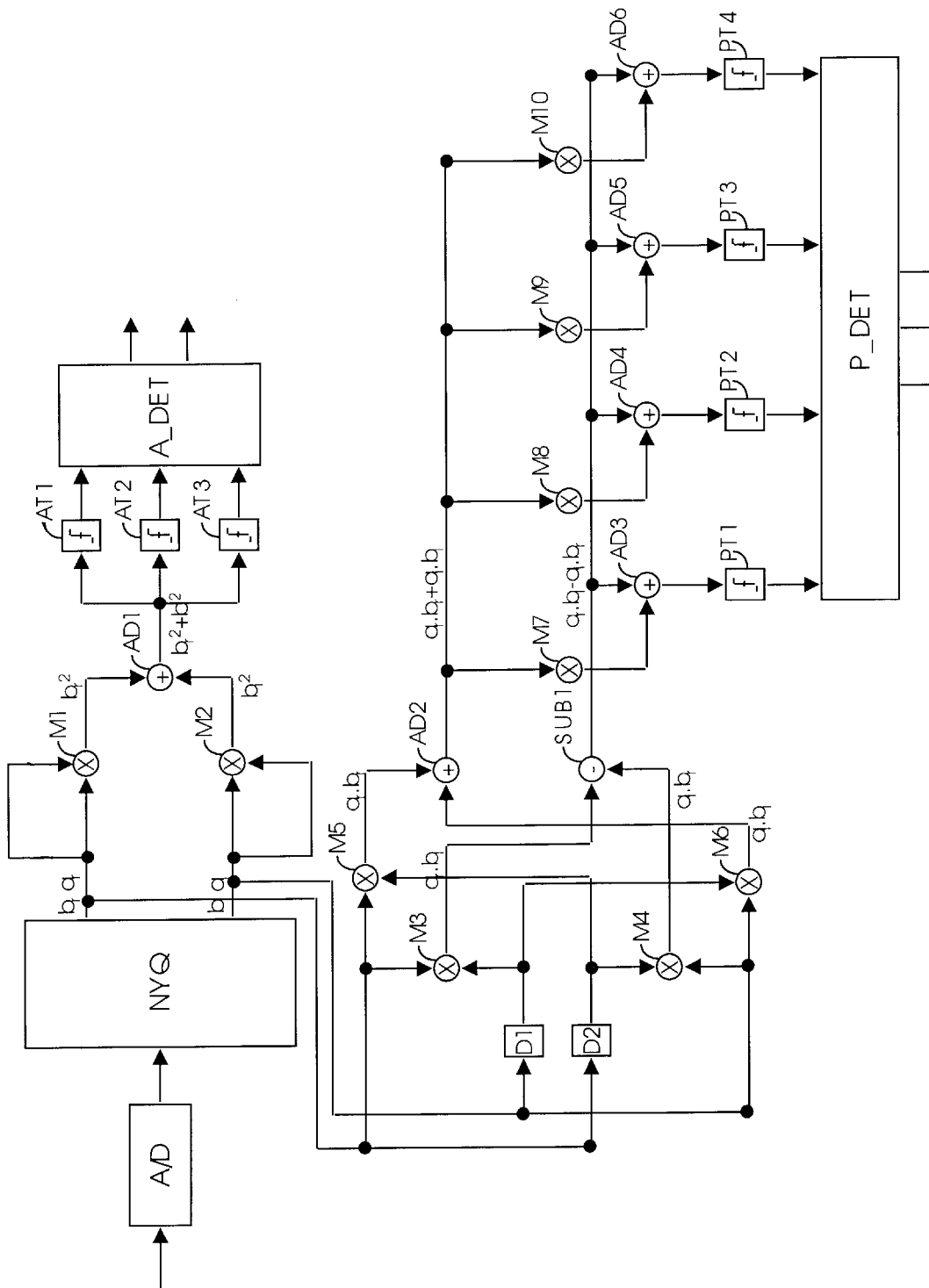
FIG. 3 is a functional block scheme of an embodiment of the demodulator arrangement according to the present invention, used in system of FIG. 1.

The demodulator arrangement incorporated in the head end station HE of FIG. 1 for demodulation of upstream transferred information and incorporated in the terminals TA, TB, TC and TD for demodulation of downstream broadcasted information, uses the constellation scheme of FIG. 2 for demodulating data symbols. This circular constellation scheme contains 32 constellation points distributed over 4 amplitude levels, A1, A2, A3 and A4, with equidistant amplitudes: B, B+A, B+2A and B+3A. The constellation points can have 8 different phases, P1, P2, P3, P4, P5, P6, P7 and P8, which are also equidistantly distributed. The constellation points are so labelled that their label is indicative for both their amplitude level and their phase: A1P1, A1P2, A1P3, A1P4, A1P5, A1P6, A1P7, A1P8, A2P1, A2P2, A2P3, A2P4, A2P5, A2P6, A2P7, A2P8, A3P1, A3P2, A3P3, A3P4, A3P5, A3P6, A3P7, A3P8, A4P1, A4P2, A4P3, A4P4, A4P5, A4P6, A4P7 and A4P8. The constellation is thus based on equidistant circles on which the constellation points are placed on angles, equally spaced from one another. The matrix of amplitudes and phases is always full, i.e. the number of phases on each circle is equal. It is noticed that it could be seen as advantageous to define, as an alternative for the constellation diagram of FIG. 2, a number of inner circles with a small radius whereon less constellation points are put. However, for differential phase detection, this has nearly no advantage since the uncertainty on the differential phase is dependent mainly on the worst case, i.e. the inner points. So, not much more constellation points can be placed on the larger circles because the uncertainty on the differential phase still requires a large phase difference, also between the outer points. For this reason, only constellations with a completely filled combination of amplitudes and phases are considered here.

It is assumed that the modulation is quasi optimal when for every constellation point, the closest distance to a region in the constellation diagram associated with an adjacent constellation point shows a flat distribution, with all values higher than but as close as possible to a threshold value. If the instantaneous noise voltage remains smaller than this minimal distance value, no bit error will occur. Under this condition, the ratio between the square of this maximal noise voltage and the average received power determines the signal to noise ratio for a certain bit error rate.

Regions in the constellation diagram with an equal chance of being reached by white noise from a certain constellation point are named here equiprobable error regions. In the amplitude direction, the equiprobable error region is simply determined by the Gaussian noise power. In the phase direction, the worst case for differential detection occurs when the differential phase is measured between a constellation point closest to the origin and any other point. For points far away from the origin, the equiprobable error region for differential detection will be strongly extended in the phase direction. For the calculations, it is assumed that the equiprobable error region in the phase direction is given by the root of the sum of the squares of the phase equiprobale error region of the constellation point under study, combined with a constellation point closest to the origin. For large constellations under differential detection, this means that the outer constellation points must be spaced far away in the phase direction, since they can always be combined with an inner point, showing a much larger noise on the phase. This explains the inherent loss of signal to noise budget under differential detection on large constellations: the inner region cannot be used because it would cause a large noise on the differential phase of all other points in the diagram and the outer points cannot be placed optimally close to one another in the phase direction because their phase accuracy is strongly reduced by differential detection with an inner point.

In the light of the above made assumptions, three noise sources have an effect on the equiprobable error regions: white Gaussian noise, phase noise and amplitude uncertainty. White Gaussian noise results in a circular region of equiprobable error in the I-Q plane of FIG. 2, phase noise results in an extension of the equiprobable error regions in phase direction, and amplitude uncertainty of the received signal results in an extension of the equiprobable error region in the amplitude direction. The most suitable constellation diagram, i.e. the one that provides the best noise robustness, is a diagram with equidistant phases and equidistant amplitude levels for the constellation points.

The demodulator arrangement drawn in FIG. 3 includes an analogue to digital converter A/D, a Nyquist filter NYQ, a first and second multiplier M1 and M2, a first adder AD1, a first, second and third amplitude threshold comparator AT1, AT2 and AT3, an amplitude detector A_DET, a third, fourth, fifth and sixth multiplier M3, M4, M5 and M6, a subtractor SUB1, a second adder AD2, a first and second delay unit D1 and D2, a seventh, eight, ninth, and tenth multiplier M7, M8, M9 and M10, a third, fourth, fifth and sixth adder AD3, AD4, AD5 and AD6, a first, second, third and fourth phase threshold comparator PT1, PT2, PT3 and PT4, and a phase detector P_DET.

The analogue to digital converter A/D and Nyquist filter NYQ are cascade coupled to an input terminal of the demodulator arrangement, the Nyquist filter NYQ having two output terminals. These two output terminals of the Nyquist filter NYQ serve as inputs for a coherent amplitude detecting arrangement on the one hand and a differential phase detecting arrangement on the other hand. The amplitude detecting arrangement contains the parallel coupling of the first multiplier M1, connected with its two inputs to the first output terminal of the Nyquist filter NYQ, and the second multiplier M2, connected with its two inputs to the second output terminal of the Nyquist filter NYQ. the outputs of the first multiplier M1 and the second multiplier M2 are connected respectively to a first input terminal and a second input terminal of the first adder ADD1, and the latter first adder ADD1 is connected via its output terminal to inputs of the first, second and third amplitude threshold comparator AT1, AT2 and AT3. The first amplitude threshold comparator AT1 has an output coupled to a first input of the amplitude detector A_DET, the second amplitude threshold comparator AT2 has an output coupled to a second input of the amplitude detector A_DET, and the third amplitude threshold comparator AT3 has an output coupled to a third input of the amplitude detector A_DET. The amplitude detector A_DET is equipped with two output terminals which serve as outputs for the whole demodulator arrangement. The above mentioned phase detecting arrangement is coupled parallel with the just described amplitude detecting arrangement to the two output terminals of the Nyquist filter NYQ. The third multiplier M3 has two inputs whereto respectively the first output terminal of the Nyquist filter NYQ is connected, and the second output of the Nyquist filter NYQ is coupled via the first delay unit D1. The fourth multiplier M4 has two inputs whereto respectively the second output of the Nyquist filter NYQ is connected and the first output terminal of the Nyquist filter NYQ is coupled via the second delay unit D2. The fifth multiplier M5 has two inputs whereto respectively the first output of the Nyquist filter NYQ is connected and the first output terminal of the Nyquist filter NYQ is coupled via the second delay unit D2. The sixth multiplier M6 has two inputs whereto respectively the second output of the Nyquist filter NYQ is connected and the second output terminal of the Nyquist filter NYQ is coupled via the first delay unit D1. Output terminals of the third multiplier M3 and fourth multiplier M4 are connected to input terminals of the subtractor SUB1, and this subtractor SUB1 is with its output terminal connected to first inputs of the third, fourth, fifth and sixth adder AD3, AD4, AD5 and AD6. Output terminals of the fifth multiplier M5 and the sixth multiplier M6 are connected to input terminals of the second adder AD2, and the output terminal of this second adder AD2 is coupled via the seventh multiplier M7 to the second input of the third adder AD3, via the eight multiplier M8 to the second input of the fourth adder AD4, via the ninth multiplier M9 to the second input of the fifth adder AD5, and via the tenth multiplier M10 to the second input of the sixth adder AD6. The third adder AD3 is coupled with its output to a first input terminal of the phase detector P_DET via the first phase threshold comparator PT1, the fourth adder AD4 is coupled with its output to a second input terminal of the phase detector P_DET via the second phase threshold comparator PT2, the fifth adder AD5 is coupled with its output to a third input terminal of the phase detector P_DET via the third phase threshold comparator PT3, and the sixth adder AD6 is coupled with its output to the fourth input terminal of the phase detector P_DET via the fourth phase threshold comparator PT4. The phase detector P_DET is equipped with three output terminals which serve as third, fourth and fifth output terminals for the whole demodulator arrangement.

The proposed constellation is based on a separate detection of the amplitude and the differential phase. The amplitude is detected on an absolute scale, since the amplitude is controlled by a ranging circuit or is controlled by a look-up table in the receiver. The phase is detected differentially compared to the previous constellation point. For a DSP (Digital Signal Processing) implementation, the square of the amplitude is found as the sum of the square of the real and imaginary parts of the currently received data symbol. The differential phase is found by a complex division of the current and the previous data symbol. Using a number of thresholds on the values of amplitude and phase gives the resulting bit pattern. How this principle is realised by the demodulator drawn in FIG. 3 is explained in detail in the following paragraph.

The incoming signal of the demodulator of FIG. 3 is digitised by the analogue to digital converter A/D and filtered by the Nyquist filter NYQ. Each digital data symbol at the output of the Nyquist filter NYQ corresponds to a point in the I-Q plane of FIG. 2 and to a complex number with a real and imaginary part. The real parts of successive data symbols are sourced via the first output of the Nyquist filter NYQ and the imaginary parts of the successive data symbols are sourced via the second output of the Nyquist filter NYQ. The amplitude detecting arrangement has the task to detect on which one of the four circles of the constellation diagram of FIG. 2, the point that corresponds to the incoming data symbol is laying. The amplitude detecting arrangement thereto determines the square of the amplitude of the complex number $b_r+j.b_i$ sourced by the Nyquist filter NYQ and compares this square amplitude with three thresholds. The first multiplier M1 calculates the square $b_r^2$ of the real part $b_r$ of a received data symbol, the second multiplier M2 calculates the square $b_i^2$ of the imaginary part $b_i$ of the received data symbol, and the first adder AD1 calculates the square amplitude $b_r^2+b_i^2$. The first, second and third amplitude threshold comparators AT1, AT2 and AT3 determine whether the square amplitude $b_r^2+b_i^2$ is lower than or higher than three threshold values which are chosen so as to distinguish points on the four circles of FIG. 2 from each other, even when affected by noise. The amplitude detector A_DET determines on the basis of the output of the amplitude threshold comparators AT1, AT2 and AT3 on which circle the received constellation point is laying and derives therefrom two bits of the data symbol. The phase detecting arrangement has the task to detect the phase of the received constellation point and has to map this phase to one of the eight possible phases in the constellation diagram of FIG. 2. The phase detecting arrangement thereto divides two successive complex numbers, $b_r+ib_i$ and $a_r+ja_i$. Indeed, the complex number $c_r+jc_i$ obtained by dividing $b_r+jb_i$ by $a_r+ja_i$ is equal to $(a_r.b_r+a_i.b_i)/(a_r^2+a_i^2)+j(a_r.b_i-a_i.b_r)/(a_r^2+a_i^2)$ and has a phase equal to the difference in phase between the complex numbers $a_r+ja_i$ and $b_r+ib_i$. the complex number $c_r'+jc_i'$ equal to $(a_r.b_r+a_i.b_i)+j(a_r.b_i-a_i.b_r)$ has the same phase as the complex number $c_r+jc_i$ since it is proportional thereto with a factor $a_r^2+a_i^2$. The phase detecting arrangement of FIG. 3 thus starts from the two successive data symbols $a_r+ja_i$ and $b_r+ib_i$ to calculate $c_r'+jc_i'$ and then compares the phase of $c_r'+jc_i'$ with four phase thresholds to derive therefrom the 3 remaining bits modulated on the data symbol. The third multiplier M3 calculates $a_r.b_i$ and the fourth multiplier M4 calculates $a_i.b_r$. The output $a_i.b_r$ of multiplier M4 is subtracted from the output $a_r.b_i$ of multiplier M3 by the subtractor SUB1 which so produces $c_i'$. The fifth multiplier M5 calculates $a_r.b_r$ and the sixth multiplier M6 calculates $a_i.b_i$. The output $a_r.b_r$ of the fifth multiplier M5 and the output $a_i.b_i$ of the sixth multiplier M6 are added together by the second adder AD2 which so produces $c_r'$. The real part $c_r'$ and imaginary part $c_i'$ are shifted in phase over 90 degrees vis-à-vis each other by the multipliers or mixers M7, M8, M9 and M10. The third adder AD3, the fourth adder AD4, the fifth adder AD5 and the sixth adder AD6 afterwards constitute from $c_r'$ and $c_i'$ the complex number $c_r'+jc_i'$ and the four phase threshold comparators PT1, PT2, PT3 and PT4 compare the phase of $c_r'+jc_i'$ with four phase threshold values to derive therefrom to which one of the eight possible values, 0, $\pi/4$, $\pi/2$, $3\pi/4$, $\pi$, $5\pi/4$, $3\pi/2$, $7\pi/4$ or $2\pi$ radians, this phase is equal. The so obtained phase from $c_r'+jc_i'$ is equal to the phase difference between $a_r+ja_i$ and $b_r+jb_i$. If the phase detector P_DET knows the phase of the previous data symbol $a_r+ja_i$, it can calculate from the output signals of the four phase threshold comparators PT1, PT2, PT3 and PT4 the phase of the successive data symbol $b_r+jb_i$. This phase then determines the three remaining bits of the data symbol. Together with the two bits at the output of the amplitude detector A_DET, the three outputs of the phase detector P_DET constitute the demodulated data symbol.

A first remark is that two methods of placing the points on circles may be considered: linear, as illustrated by FIG. 2, and staggered. In the linear filling, the phase on the circles with even index and odd index is the same. In the staggered filling, the phases of points on the circles with even index is half a step offset in comparison with the phases of points on the circles with odd index. In this way, a somewhat larger distance is created between the constellation points. For the detection of linear constellations, the detection of phase and amplitude is completely independent. The detection of the amplitude bits requires a number of thresholds, one less than the number of amplitude levels, as was illustrated above by the embodiment with three amplitude thresholds and four amplitude levels. The detection of the differential phase requires approximately $\log_2$ of the number of phase steps. For the detection of staggered constellations, twice the number of thresholds is required in the amplitude direction and twice the number of phase states must be detected. A truth table is required there for looking up the combinations of amplitude and phase that lead to correct values associated with a constellation point. It must be considered that a staggered constellation needs a more complex receiver architecture than the one drawn in FIG. 3. For the staggered constellations, two threshold amplitude levels are defined per circle. These allow a better confinement of the occupied area in the constellation diagram to the equiprobable error region ellipse.

The parameters to optimise when selecting a constellation are the number of circles and the radius of each circle and the number of phase levels (only constellations with an equal number of points per circle are considered). The value to be optimised is the ratio between the square of the maximal allowed noise voltage $\sigma^2$ (i.e. the noise power) over the average power E of the constellation (i.e. the signal power), under the boundary condition that the equiprobable error regions of all points do not overlap. This figure of $\sigma^2/E$ is the figure of merit for the constellation. Lab test have shown that the gain in noise power over signal power achieved by using staggered constellations instead of linear constellations always remains less than 0.6 dB. In a cable environment, it seems that the additional implementation complexity of staggered constellations is not worth this small gain, at least not as long as intermodulation does not impose very stringent power limitations.

It is noticed that although the above described embodiment of a demodulator arrangement according to the present invention is used in a hybrid fibre coax system, applicability of this invention is not limited to telecommunication systems wherein the physical links are constituted by optical fibres or coaxial cables. In fact, the demodulator arrangement according to the present invention is optimal for use in systems wherein the physical transmission medium has slowly varying amplitude characteristics, like twisted pair copper cables, coaxial cables, optical fibres, . . . , and wherein the carrier frequency is not exactly known at the receiver, for instance because of the bursty nature of the transmission like in upstream hybrid fibre coax systems. The slowly varying amplitude characteristics justify the coherent amplitude detection, whereas the unknown carrier frequency justifies the differential phase detection.

Another remark is that an embodiment of the present invention is described above in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given for most of them.

While the principles of the invention have been described above in connection with specific apparatus, it is to be clearly understood that this description is made only by way of example and not as a limitation on the scope of the invention.

What is claimed is:

1. Demodulator arrangement for use in a receiver that is able to receive information bursts transferred from at least one transmitter to said receiver over a transmission medium with substantially stable attenuation characteristics, said demodulator arrangement comprising:

amplitude detection means for detecting an amplitude of each data symbol which forms part of said information bursts and which is modulated in a said transmitter in accordance with a predefined constellation diagram; and phase detection means for detecting phase of each data symbol which forms part of said information bursts and which is modulated in a said transmitter in accordance with a predefined constellation diagram, wherein said amplitude detection means are adapted to detect said amplitude in a coherent way and said phase detection means are adapted to detect said phase in a differential way.

2. Demodulator arrangement according to claim 1, wherein said constellation diagram is a large constellation diagram comprising at least sixteen constellation points distributed over at least three amplitude levels.

3. Demodulator arrangement according to claim 1, wherein said constellation diagram is a circular constellation diagram wherein phases of constellation points on each amplitude level are equidistantly distributed and wherein amplitude levels of said constellation points are equidistantly distributed.

4. Demodulator arrangement according to claim 3 wherein phases of constellation points on even indexed amplitude levels are shifted half a step in comparison with phases of constellation points on odd indexed amplitude levels.

5. Demodulator arrangement according to claim 1, wherein said transmission medium is a hybrid fibre coax network, said at least one transmitter are cable modems and said receiver is a head end station of a hybrid fibre coax system.

6. Demodulator arrangement according to claim 1, wherein said transmission medium is a hybrid fibre coax network, said at least one transmitter is a head end station of a hybrid fibre coax system and said receiver is a cable modems.

7. Telecommunication system comprising:

transmitting nodes, receiving nodes, and a transmission medium with substantially stable attenuation characteristics interconnecting said transmitting nodes and said receiving nodes, wherein at least one of said receiving nodes comprises a demodulator arrangement as defined in claim 1.

8. Method to demodulate in a receiver data symbols which form part of information bursts transferred from at least one transmitter to said receiver over a transmission medium with substantially stable attenuation characteristics, said method comprising:

the steps of detecting an amplitude of each data symbol which forms part of said information bursts and which are modulated in said at least one transmitter in accordance with a predefined constellation diagram; and detecting a phase of each data symbol which forms part of said information bursts and which are modulated in said at least one transmitter in accordance with a predefined constellation diagram, wherein said amplitude is detected in a coherent way and said phase is detected in a differential way.

9. Telecommunication system comprising:

transmitting nodes, receiving nodes, and a transmission medium with substantially stable attenuation characteristics interconnecting said transmitting nodes and said receiving nodes, wherein at least one of said receiving nodes comprises a demodulator with a coherent amplitude detection and a differential phase detection.

10. The telecommunication system according to claim 9, wherein said amplitude detection is independent of said phase detection.

11. The telecommunication system according to claim 10, wherein said predefined constellation diagram is a circular constellation diagram wherein phases of constellation points on each amplitude level are equidistantly distributed and wherein amplitude levels of said constellation points are equidistantly distributed.

12. The telecommunication system according to claim 10, wherein phases of constellation points on even indexed amplitude levels are shifted half a step in comparison with phases of constellation points on odd indexed amplitude levels.

13. The telecommunication system according to claim 9, wherein all modulations are performed in accordance with a predefined constellation diagram.

14. The telecommunication system according to claim 9, wherein said coherent amplitude detection is performed using a plurality of comparators.

15. The telecommunication system according to claim 9, wherein said differential phase detection is performed using a plurality of threshold comparators.

16. Demodulator arrangement for use in a receiver that is able to receive information bursts transferred from at least one transmitter to said receiver over a transmission medium with substantially stable attenuation characteristics, said demodulator arrangement comprising:

amplitude detection means for coherently detecting an amplitude of each data symbol which forms part of said information bursts and which is modulated in a said transmitter in accordance with a predefined constellation diagram; and phase detection means for differentially detecting phase of each data symbol which forms part of said information bursts and which is modulated in a said transmitter in accordance with a predefined constellation diagram, wherein said data symbol corresponds to a complex number with a real and imaginary part for amplitude detection.

17. The demodulator arrangement according to claim 16, wherein said amplitude detecting means determines a square of said complex number and compares said square to at least two thresholds.

18. The demodulator arrangement according to claim 17, wherein:

a first multiplier calculates said square of the real part of the complex number, a second multiplier calculates said square of the imaginary part of the complex number, and an adder calculates the square amplitude of said real and imaginary part of the complex number.

19. The demodulator arrangement according to claim 16, wherein said phase detection means divides two successive complex numbers to determine a phase shift.

\* \* \* \* \*